United States Patent [19]

Poux et al.

[11] Patent Number: 4,776,242

[45] Date of Patent: Oct. 11, 1988

[54] AUTOMATIC MULTIPLE FEED APPARATUS

[75] Inventors: Christopher J. Poux, Trenton; John G. Aceti, Princeton Junction, both of N.J.

[73] Assignee: General Electric Company, Schenectady, N.Y.

[21] Appl. No.: 45,657

[22] Filed: May 4, 1987

[51] Int. Cl.$^4$ .............................................. B25B 23/04
[52] U.S. Cl. ...................................... 81/57.37; 81/432
[58] Field of Search ................. 81/57.37, 430–435; 173/143; 227/107; 29/759

[56] References Cited

U.S. PATENT DOCUMENTS

| | | | |
|---|---|---|---|
| 3,104,458 | 9/1963 | Conviser | 29/208 |
| 3,328,873 | 7/1967 | Schweers | 29/208 |
| 3,907,014 | 9/1975 | Manino | 81/433 |
| 3,930,808 | 1/1976 | Miller et al. | 81/433 X |

FOREIGN PATENT DOCUMENTS

| | | | |
|---|---|---|---|
| 213621 | 9/1984 | German Democratic Rep. | 81/57.37 |
| 795854 | 1/1981 | U.S.S.R. | |
| 854671 | 8/1981 | U.S.S.R. | |

Primary Examiner—James G. Smith
Attorney, Agent, or Firm—William Squire; James C. Davis, Jr.; Paul R. Webb, II

[57] ABSTRACT

Two vibratory feeders are coupled to a switching mechanism for feeding screws to a robotically operated screw driver. The feeders include screw sensors which cause a control to switch feeders in case of a sensed jam in the feeder then in operation. An operator is alerted to correct the jam and place the cleared feeder in stand-by.

14 Claims, 2 Drawing Sheets

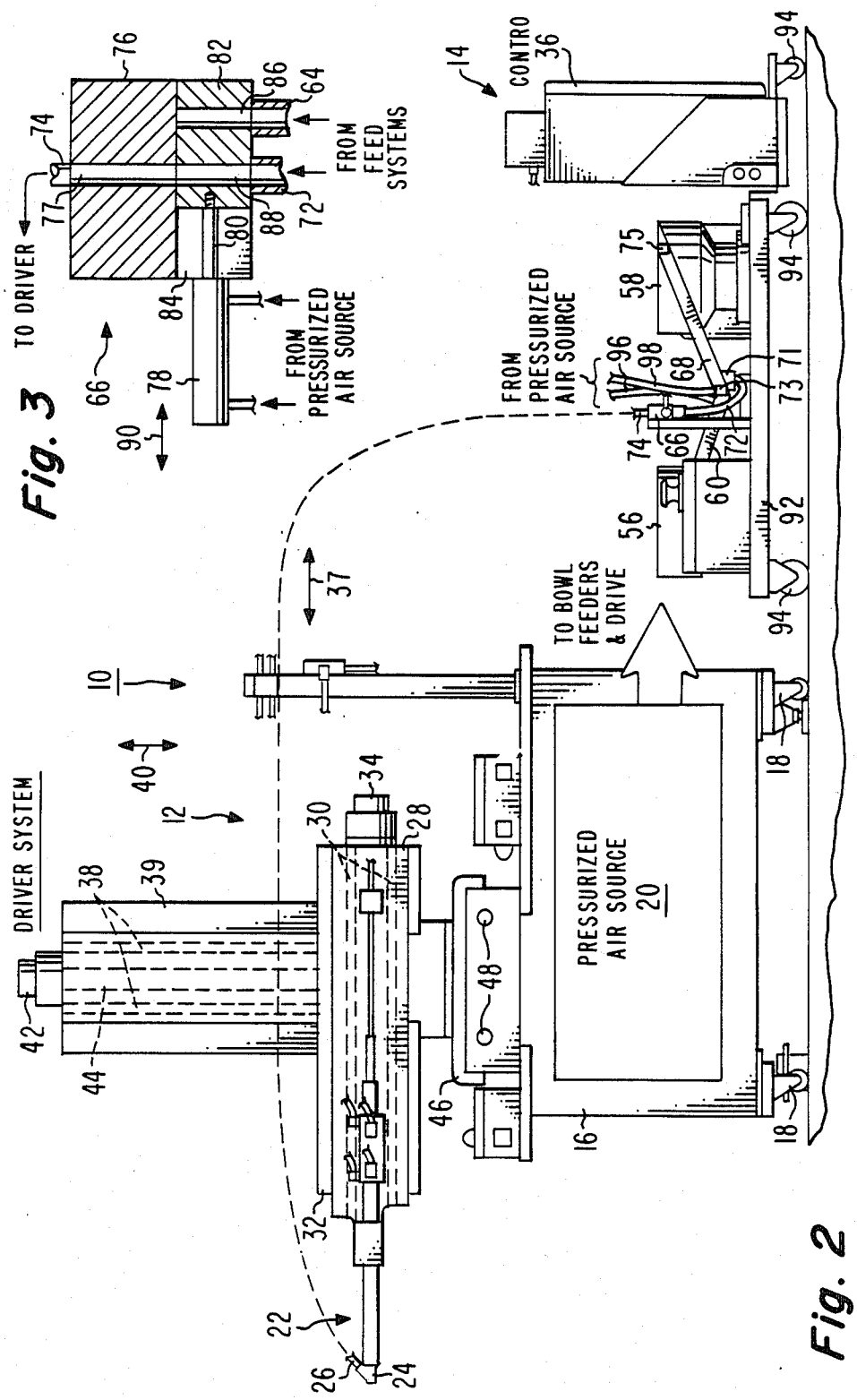

AUTOMATIC MULTIPLE FEED APPARATUS

This invention relates to automatic hardware element attachment systems, for example, screw driver systems, employing vibratory feed systems.

In a manufacturing automatic assembly line, it is desirable to provide as high a throughput as possible. Robotic systems are employed wherever possible for this purpose. A robotic system requires that component parts, e.g., hardware such as fasteners and other structures which are to be attached by the fasteners, pass through a given workstation for processing by the robotic system at that workstation. Because the throughput of a multistation assembly line is dependent on the throughput of each workstation, a significant problem at any one workstation can shut down the entire line.

For these reasons, it is common to provide backup systems for robotic assembly systems. In one type of hardware system, e.g., a screw drive system, often a number of screws are required to attach one structure to another, for example, five screws are required to attach a back cover to a television receiver cabinet in one implementation. A number of choices can be made in providing the appropriate robotic tools. One choice would be to provide five different automatic screw drivers, each for driving a screw at a different location on the back cover. Further, each screw driver system requires a screw feed system which might include a vibratory feedbowl and associated tracks and hardware. In the alternative, in a second choice to simplify the arrangement, one feed bowl may be used to supply screws to all five drive systems. However, this solution still is relatively costly due to the number of drive systems used. Further, a backup screw drive system normally would be required to duplicate the five drive systems and feed system making the system cost prohibitive.

An alternate solution in a third choice is to provide an automatic robotic screw driver head which is displaceable by a computer-operated controller in XYZ coordinates for driving screws at each of the five different locations. However, downtime can occur relatively frequently because of the use of a single drive head in case of screw jams in the system. Therefore, in this kind of a system, a redundant robotic screw drive system would be included should the single robotic system fail during an assembly sequence. However, redundant robotic screw drive systems are bulky and relatively costly and, therefore, not entirely satisfactory.

Normally, in commercial vibratory feed systems, a feedbowl or feed drum feeds screws, washers, nuts and other similar hardware from a single feed source diverting the hardware to multiple workstations or tools. However, should the hardware in any portion of the feed system jam, then all of the workstations or tools become inoperative until the jam is corrected. The way around this problem in prior art systems is therefore to provide redundant workstation systems wherein the entire system is duplicated at a second location. Such a solution is not economically desirable.

A major cause of downtime in such systems occurs during the vibratory feed portion of the cycle. When jam-ups occur in the robotically-operated attaching system they are usually due to hardware faults, such as poorly formed screws, nuts, washers and so forth, or extraneous foreign matter that somehow has entered into the feed system due to poor screening by the hardware supplier. The present inventors discovered that by providing high reliability to the supplied hardware, jam-ups at the robotic processing portions of the assembly process are greatly alleviated.

The present inventors have also discovered that vibratory feed systems are still generally prone to feed jams even with properly-designed hardware. Therefore, they have found that a high reliability feed system can be provided by switching multiple vibratory feed systems in a manner to feed hardware to a single robotic hardware attachment drive system without redundancy in the drive system, providing a considerable cost saving in eliminating a redundant robotic system.

According to the present invention, the reliability of a single workstation is improved by an automatic element multiple feed apparatus which comprises at least one element attachment means for automatically attaching a received element to a workpiece. At least two vibratory element feed systems are included for the vibratory sequential feeding of elements to the at least one element attachment means. A feed system switching means is coupled to and between the at least two feed systems and the at least one element attachment means for selectively coupling one of the feed systems to the attachment means in response to the failure of the element feeding of the other feed system. Thus, elements are continuously fed to the attachment means from the selected feed system regardless of the failure of the feeding by one of the systems. This avoids work stoppage.

In the Drawing

FIG. 2 is a side elevation view of the embodiment of FIG. 1; and

FIG. 3 is a sectional view of a hardware element switching device taken along lines 3—3 in FIG. 1.

Figure 1:
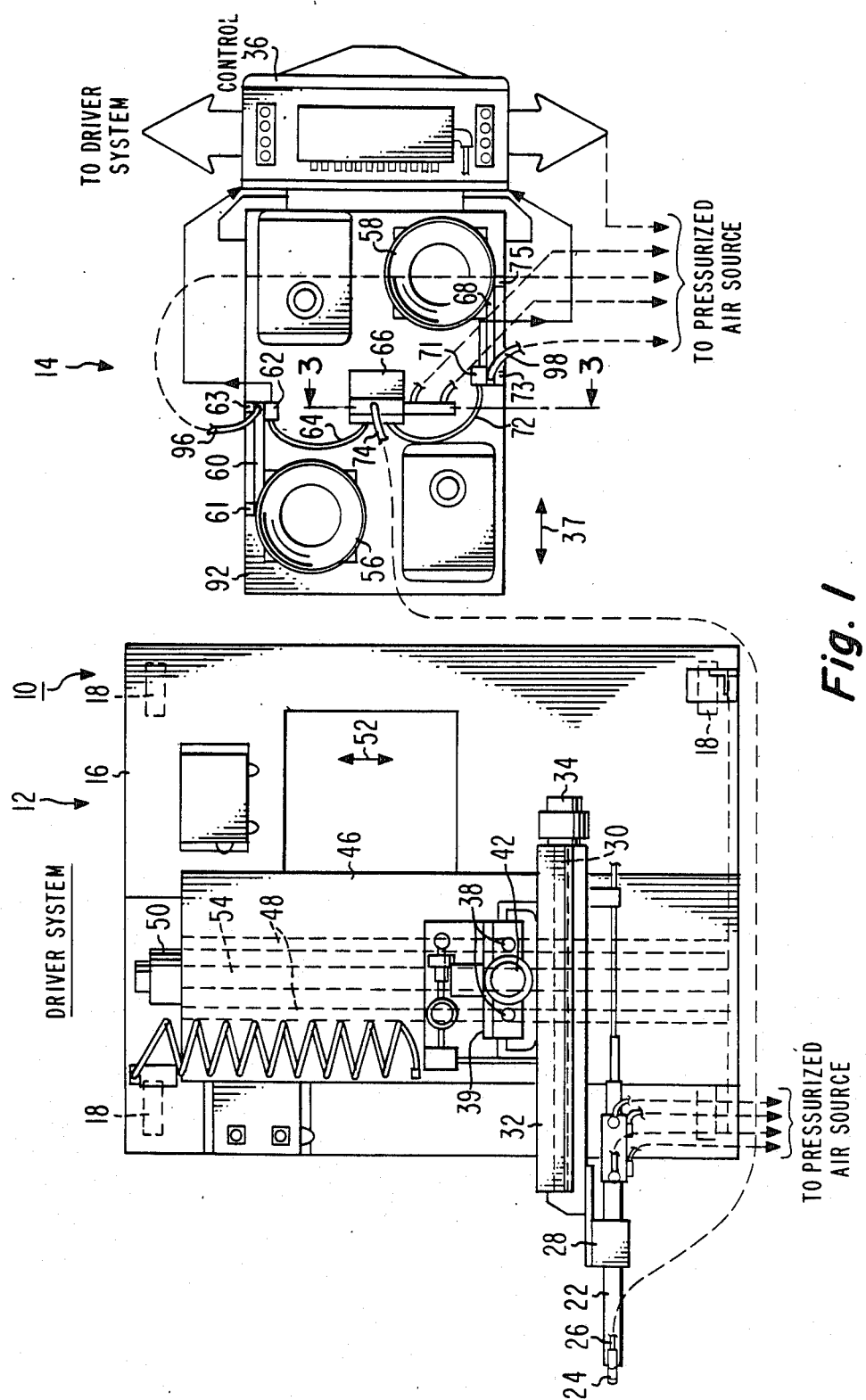
FIG. 1 is a plan view of an automatic multiple feed apparatus in accordance with one embodiment of the present invention.

In FIGS. 1 and 2, a system 10 for assembling hardware, e.g., screws, for attaching one workpiece to a second workpiece includes a driver system 12 and a screw feed system 14. It is to be understood that while screws are described herein, for purposes of illustration, the system 12 may be employed for attaching any of a number of different kinds of hardware to a workpiece, for example, nuts, bolts, rivets or other elements. The term "hardware elements" as employed herein refers to different kinds of such hardware and may be made of metal, thermoplastic and other materials. Normally, such hardware elements are employed for fastening purposes but such fastening function is not essential to the system described herein.

Driver system 12 is of standard design and only so much of it will be described herein for an understanding of the present invention. System 12 comprises a base 16 which may be mounted on casters 18 for portability. Secured to base 16 are air filters, pressure regulators, connecting air lines and other structures associated with a pressurized air source 20 for pneumatically operating the different portions of the system. Secured to base 16 is a screw driver head assembly 22. Assembly 22 has a head 24 which receives screws (not shown) via a supply tube 26 from a screw feed system 14. Assembly 22 is mounted on a carriage 28. Carriage 28 is slideably secured to a pair of parallel guide rods 30 secured to support 32. A motor 34 secured to support 32 displaces the carriage 28 in horizontal directions 37 by means of a ball screw (not shown). Motor 34 is coupled to and operated by a controller (not shown) contained within control 36 in the screw feed system 14.

Support 32 is secured to a pair of parallel vertical guide rods 38 which are secured to upstanding support 39. Support 32 and carriage 28 are displaced in vertical directions 40 by a drive motor 42 secured to support 39. Motor 42 displaces the support 32 in directions 40 by means of a ball screw 44.

Support 39 is secured to a horizontal table 46. Table 46 is slidably secured to a pair of horizontal guide rods 48 secured to base 16. A motor 50 is secured to base 16 for displacing table 46 in horizontal directions 52 via a ball screw 54. Motors 42 and 50, like motor 34, are all connected to control 36 at the feed system 14. These motors are operated in synchronism with a computer program operated control for sequencing the different motors in accordance with a given set of instructions.

The head 24 is aligned in x, y and z directions with each of a plurality of locations on a workpiece (not shown). The head 24 is displaced in one of horizontal directions 37 to the left of the drawing FIGURES into engagement with the workpiece. Because a single head is used it is relatively important that screws be reliably fed and attached to a workpiece without interruption.

As mentioned in the introduction portion, the present inventors have recognized that by providing high-quality screws to the head 24, the failure of the robotic driver system 12 is minimized. That is, the reliability of system 12 head 24, as commercially available, is relatively high providing screws are continually fed thereto. The novel feed system 14 of the present invention is employed herein in recognition that the drive system 12 is highly reliable. To insure such reliability of feeding of the hardware elements to the driver system, the feed system 14 provides a redundant vibratory feed structure.

The redundant feed structure comprises two identical vibratory feedbowls 56 and 58. Feedbowl 56 includes a vibratory feed track 60 and an escapement mechanism 62 at the end of track 60 which feeds screws in sequential order to feed tube 64. Feed tube 64 supplies screws to switching mechanism 66. Proximity sensors 61 and 63 in track 60 sense the absence of screws at the top and bottom of the track, respectively. Sensors 61 and 63 send signals to control 36 indicating the absence of screws on the track 60. Bowl 58 includes a vibratory feed track 68 which feeds screws to an escapement mechanism 71 on the lower end of track 68. A screw proximity sensor 75 is at the top of track 68 and a screw proximity sensor 73 is at the bottom of track 68. These sensors sense the absence of screws on track 68 and signal this information to control 36.

Screws are fed via the escapement mechanism 71 to tube 72 which feeds the screws to switching mechanism 66. Switching mechanism 66 has an output tube 74 which supplies screws sequentially to head 24 via tube 26.

The proximity sensors 61 and 75 at the top or beginning of each track sense when the respective bowls are empty and signal the control 36 to switch bowl feeding by activating the switching mechanism 66. The proximity sensors 63 and 73 located at the bottom of the tracks sense a jam-up due to a lack of screws being fed at this point of the system. When the proximity sensors sense an absence of screws in the corresponding tracks, a signal is applied to the control 36 which automatically operates the switching mechanism 66 for switching the feeding from one bowl to the other. In the meantime, an alarm may be sounded by control 36 in the form of visible blinking lights and an audio signal to alert an operator to fix the problem at the particular bowl and track feed assembly.

In FIG. 3, the switching mechanism 66 comprises a housing 76 and a feed tube conduit 77 which supplies screws to tube 74. Secured to housing 76 is a pneumatic cylinder 78 having a piston rod 80 coupled to a switch block 82. Block 82 is closely received in and slides within a rectangular opening 84 in housing 76. Block 82 includes two parallel screw-receiving conduits 86 and 88 of about the same diameter as and parallel to conduit 77. Conduit 86 is coupled to tube 64 which receives screws from track 60 of bowl 56, FIG. 1. Conduit 88 is coupled to tube 72 for receiving screws from track 68 of bowl 58. Cylinder 78 receives pressurized air from source 20, FIG. 2, under control of control 36 for displacing block 82 from the position shown to the left of the drawing Figure to align conduit 86 with conduit 77.

Switch block 82 has two switch positions in which either conduit 86 or conduit 88 is aligned with conduit 77. These conduits respectively feed screws either from bowl 56 or bowl 58, FIG. 2, in accordance with the switch position of block 82. Control 36 determines which position the block 82 is to be placed depending on the signals from proximity sensors.

A track-blow-off system includes pressurized air supplied to tubes 96 and 98 coupled to the escapement mechanisms 71 and 63 respectively. The pressurized air supplied to tubes 96 and 98 respectively supply pressurized air to the respective tracks for blowing the feed screws through corresponding tubes 64 and 72 through the switching mechanism 76 and up tube 74 to the driver head 24. The use of such blowing system is conventional.

The entire feed system 14 comprising bowls 56 and 58, control 36 and switching mechanism 66 are mounted on a carriage 92 secured to casters 94. Driver system 12 and feed system 14 are mobile and can be moved in and out of position to different points on an assembly line.

In operation, each of the bowls 56 and 58 of FIGS. 1 and 2 are loaded with identical screws which have been prescreened to eliminate deformed screws and foreign matter. Control 36 is turned on by an operator which turns on the bowl vibrators, retracts the screw driver, vibrates the tracks and initiates a start-up code in the computer system. The track-blow-off system is also turned on.

The system 10 is synchronized with a conveyorized system (not shown) for aligning and driving the screw driver head 24 with the appropriate workpiece at the appropriate times. These cycles are under control of control 36. With the system on, the switching mechanism 66 is placed into one of the switch states, for example as shown in FIG. 3, which feeds screws from tube 72 and bowl 58 to the drive head 24. The bowl 56 vibrates to fill its track. When sensor 75 at the top of the track senses the track is filled, the bowl 56 vibration is turned off. Its screws are not being fed to the drive head because of the misalignment of the switch mechanism coupling conduit 86, FIG. 3, with the drive head tube 74. The system 14 commences to feed screws automatically to the drive head 24 employing the pressurized blow-off air via tube 98. Should a jam-up occur in track 68, sensor 73 senses the absence of screws at the lower end of the track. Immediately upon sensing the absence of such screws, the alarm is activated by control 36 and a signal is immediately sent to the pressurized air source 20 via control 36 to switch the state of switching mechanism 66, FIG. 3. At this time, bowl 56 is turned on and immediately supplies screws via tube 64 through the now-coupled conduit 86 to tube 74, continuously feeding screws to the screw head 24.

In the meantime, the operator who is alerted by the signals from control 36 may attend to the jam or other problem at bowl 58 and make the bowl operative. In the interim period, screws are continuously being fed to driver 24. Reliability of this system has been determined to be over 99% and its operation experienced relatively few down times employing a minimum amount of equipment and a minimum amount of factory floorspace. Should a lack of screws or similar situation occur, an alarm is sounded to alert an operator to fix the problem and simultaneously therewith, the switching mechanism switches feeding of the screws from the second standby vibratory bowl and its vibration turned on to feed screws to the screw driver without interruption. Since the average jam-up takes only a matter of a few minutes to correct, most of the time those bowls are in readiness for feeding in which one bowl is feeding and the other is off in standby.

What is claimed is:

1. An automatic element multiple feed apparatus comprising:
   at least one element attachment means for automatically attaching a received element to a workpiece;
   at least two vibratory element feed systems for vibratory sequential feeding of elements to said at least one element attachment means; and
   feed system switching means coupled to and between said at least two feed systems and said at least one element attachment means, said switching means including means for selectively coupling one of said feed systems to said attachment means in response to failure of element feeding of the other feed system to thereby continuously feed elements to said attachment means from the selected feed system regardless of the failure of feed by one of the systems.

2. The apparatus of claim 1 wherein said feed systems each include element sensor means for sensing the absence of said elements in said feed systems, said switching means includes control means responsive to said sensed absence of elements at one of said feed systems for switching to the other feed system to thereby continuously feed said elements to said attachment means.

3. An automatic screw driving apparatus comprising:
   at least one screw driving head for automatically driving a received screw into a workpiece;
   at least two vibratory screw feed systems for the vibratory feeding of screws to said at least one screw driving head; and
   feed switching means coupled to and between said at least two feed systems and said at least one screw driving head, said switching means being operated for selectively coupling one of said feed systems to said driving head in response to the failure of screw feeding at the other system to thereby continuously feed screws to said head from a selected feed system.

4. The apparatus of claim 3 wherein said feed systems each include sensor means for sensing the presence and absence of screws fed to said switching means and control means responsive to said sensor means for operating said switching means to couple another of said feed systems to said head when the sensor means senses the absence of screws being fed from said selected one feed system then coupled to said head.

5. The apparatus of claim 3 wherein said switching means includes a first member having a screw feeding conduit coupled to said screw driving head and a second member moveably secured to the first member, the second member having first and second screw feeding conduits coupled to respective different ones of said feed systems, said switching means being secured to the first and second members for selectively coupling one of said first and second conduits with said first member conduit.

6. The apparatus of claim 5 wherein said switching means includes pneumatically operated means for displacing said second member to a location to align said one of said first and second conduit with the first member conduit.

7. The apparatus of claim 3 wherein said head includes alignment means for displacing said head in three orthogonal directions.

8. The apparatus of claim 3 wherein said vibratory feed systems each include a vibratory bowl and a track for feeding aligned screws from said bowl, said switching means including a pneumatically operated path switching device and sensor means coupled to each track for sensing the absence of screws in that track, said switching means including control means responsive to said sensed absence of screws for coupling a second, different track to said head without interruption of screws fed to said head.

9. An automatic fastener attachment system comprising:
   a robotically operated fastener attaching head for automatically attaching a fastener to a workpiece;
   a plurality of vibratory fastener feed apparatuses for feeding fasteners to said head;
   feed switching means for selective coupling one of said feed apparatuses to said head including fastener sensor means coupled thereto for sensing the absence of fasteners in that feed apparatus; and
   control means responsive to said sensed absence of fasteners in that feed apparatus for operating said switching means to couple another of said plurality of apparatuses to said head without interruption in the feed of fasteners to said head.

10. The system of claim 9 wherein said apparatuses each included pressurized air means for blowing a fed fastener into said switching means and thence to said head.

11. The system of claim 9 wherein said feed apparatuses each include means for providing said head with an aligned fastener, one at a time, said switching means including means for providing said fasteners to said head from each feed apparatus without interruption of the feed of fasteners in the presence of a fastener jam in one of said feed apparatuses.

12. The system of claim 11 wherein said switching means includes fastener jam sense means for sensing said jam and for switching the feed from said one apparatus to the other in response to said sensed jam.

13. An automatic element multiple feed apparatus comprising:
   at least one element attachment means for automatically attaching a received element to a workpiece;
   at least two vibratory element feed systems for selective vibratory sequential feeding of elements; and
   feed system coupling means coupled to and between said at least two feed systems and said at least one element attachment means, said coupling means including control means for selectively turning on one of said feed systems to feed elements to said attachment means and turning off the other feed system in response to failure of element feeding of that other feed system to thereby continuously feed elements to said attachment means regardless of the failure of feed by one of the systems.

14. The apparatus of claim 13 wherein said control means includes element sensor means for sensing the absence of said elements in said other feed system, said coupling means including control means responsive to said sensed absence of elements at the other of said feed systems for switching on the one feed system.

* * * * *